Nov. 29, 1966     E. J. MILLER     3,288,960
FLUID QUALITY DETECTOR
Filed Aug. 26, 1964     2 Sheets-Sheet 1
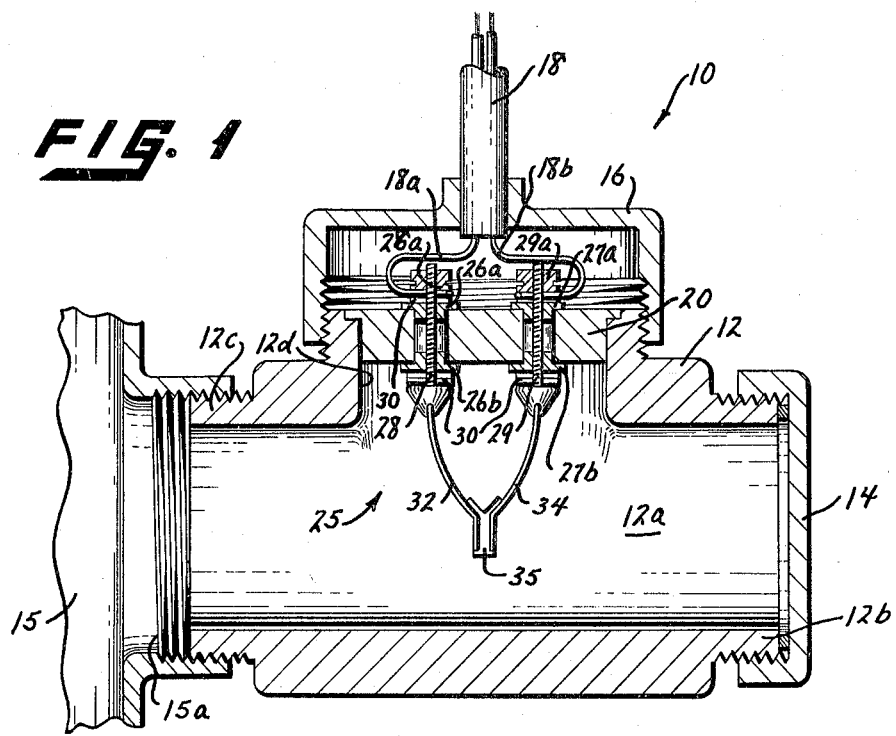
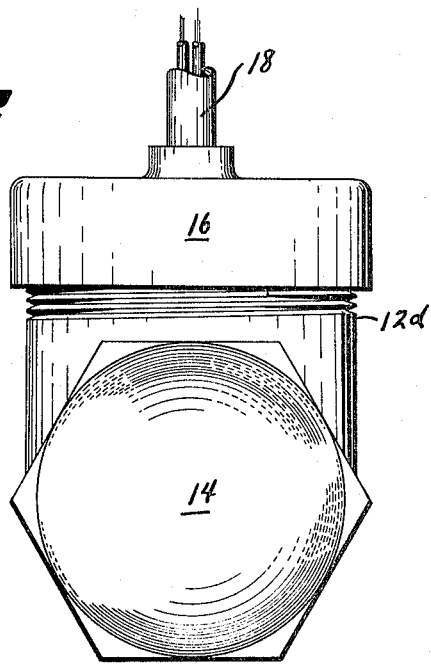
INVENTOR.
EDDY J. MILLER
BY
*Karen D. Hackbert*
Attorney Nov. 29, 1966  E. J. MILLER  3,288,960
FLUID QUALITY DETECTOR
Filed Aug. 26, 1964 2 Sheets-Sheet 2
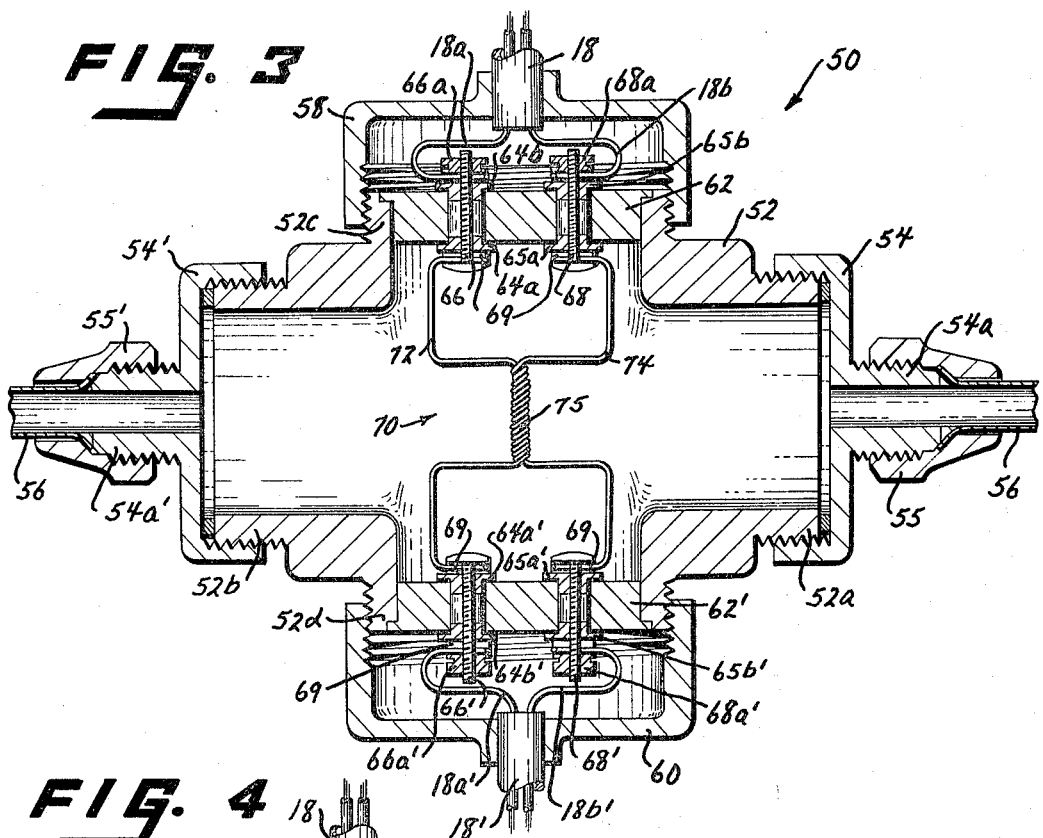
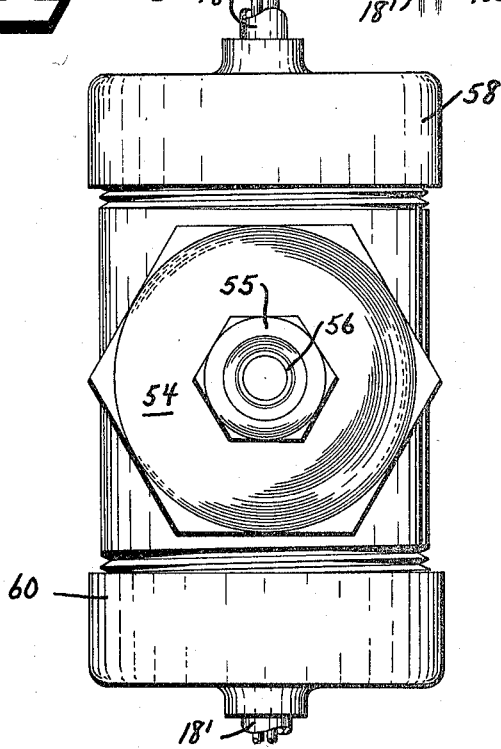
INVENTOR.
EDDY J. MILLER
BY
*Attorney*

United States Patent Office 3,288,960
Patented Nov. 29, 1966

3,288,960
FLUID QUALITY DETECTOR
Eddy J. Miller, P.O. Box 228, Newburgh, Ind.
Filed Aug. 26, 1964, Ser. No. 392,265
3 Claims. (Cl. 200—61.04)

The present invention relates to a detector, and more particularly to a new and novel means for continually and automatically sensing the quality of a flowing fluid.

As is known, and by way of example, a serious problem exists in the field of refrigeration in the control of the concentration of acid contamination of the fluids within refrigeration systems. Heretofore, such acid contamination has become apparent only after a complete breakdown of the refrigeration apparatus, or with the malfunctioning of internal components thereof. As a preventative, and most tediously, sometimes certain of the components of the refrigeration apparatus were checked on a time and usage basis to preclude the aforesaid unwanted breakdown.

In this connection, the formation of acid within a refrigeration system is oftentimes due to the addition of moisture and air into the mixture of chemicals and oil making up the refrigerant, either, for example, by remaining in the system after the manufacturing processes or field installation, or, by further example, from leaks in the low pressure side of the system or in the watercooled condenser. In any event, deterioration of operating components takes place, and while various remedies for clean-up procedures after acid contamination are known, the instant invention is directed to contamination detection in a fluid before excessive damage and/or operational failure.

By virtue of the invention herein, the applicant has provided a new and novel structure which senses a condition of deterioration from the desired quality of a flowing fluid, such as that used within a refrigeration system. The instant detector structure comprises electrically separated contacts disposed within the path of fluid flow, where the change of quality of the fluid results in electrical coaction between such contacts. As a result of the latter, a signal typically indicates such changed fluid quality, or, in the alternative, the system may even become inoperative. The preceding is accomplished in different approaches, where, for example, the detector may be disposed along a fluid flow path, or as an insert on a fluid processing device, as a compressor.

Accordingly, the principal object of the present invention is to provide a new and novel detector for sensing the quality of a fluid.

Another object of the present invention is to provide a new and novel fluid detector device which positively indicates any deviation from a desired fluid quality.

A further object of the present invention is to provide a new and novel detector device which electrically indicates fluid quality deviation, and which, at the same time, is readily disposed, where desired, in the presence of fluid flow.

A still further and more general object of the present invention is to provide a new and novel detector device which comprises a minimum number of effectively cooperable components, which is readily manufactured, and which represents a valuable contribution in money and time economies to the user.

Other objects and a better understanding of the present invention will become more apparent from the following description, taken in conjunction with the accompanying drawings, wherein FIG. 1 is a view in vertical section, partly fragmentary, showing one form of detector device in accordance with the teaching of the present invention;

FIG. 2 is a view in end elevation, looking from right to left in FIG. 1, of the detector of such figure;

FIG. 3 is a view in vertical section of another form of detector provided by the applicant herein; and, FIG. 4 is a view in end elevation, looking from right to left, in FIG. 1 of the detector of such figure.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now to FIGS. 1 and 2, the applicant's new and novel detector 10 typically comprises a body member 12, such as a casting, for example, having a passageway 12a therethrough. One end 12b of the body member 12 threadedly receives a cap member 14, while another end 12c of the body member 12 is adapted to be received in a threaded opening 15a of a compressor 15. It should be understood that the detector 10 may be used as indicated, i.e. as a control insert in a fluid processing apparatus, or, in the alternative, with the elimination of the cap member 14, may be employed as part of a fluid flow line.

In any event, the body member 12 has a laterally opening intermediate portion 12d which threadedly receives another cap member 16, where an electrical conduit 18 extends through the latter. A plate member 20 is received within the opening defined in the intermediate portion 12d of the body member 12, as by a press-fit, for example, where an electrical assembly 25, to be discussed herebelow, is positioned thereby.

In one form of the invention, the electrical assembly 25 typically comprises pairs of insulators 26a and 26b, and 27a and 27b, each pair having openings through which threaded means, as bolts 28 and 29, respectively, extend. The bolts 28 and 29 also extend through openings in the plate member 20, where the insulators 26a and 27a and 26b and 27b, are respectively disposed on opposite surfaces thereof. Typically, fiber washers 30 separate the heads of the bolts 28 and 29 from the insulators 26b and 27b, and also serve as spacers, where desired.

The electrical assembly 25 is completed through a lead 18a which extends from the conduit 18 to electrically contact the bolt 28, where a nut 28a secures same in such position, and a lead 18b which correspondingly extends from the conduit 18 to electrically contact the bolt 29, a nut 29a serving to maintain such contact. Spring members 32 and 34 are secured to the heads of the bolts 28 and 29, and being in tension, are urged towards each other.

The free ends of the spring members 32 and 34 are spaced apart by a separator 35, or, in the alternative, may be coated to serve the same purpose. In any event, the separator 35 or the coating is a material which readily dissolves or disintegrates, and depending upon particular application, may, for example, be a cellulose, an epoxy, cotton, or even varnish in the instance of coating.

In use, and when the body member 12 is positioned as, for example, a compressor insert or in an in-line relationship, intolerable acid contamination causes decomposition of the separator 35, or, if used, the coating on the contacts or free ends of the spring members 32 and 34, whereby such free ends of the spring members 32 and 34 engage. With the latter occurrence, and depending upon the particular circuitry of which the electrical conduit 18 is a part, either switching action or short-circuiting is achieved. In this connection, it might be noted that electric leads 18a and 18b may be in series in either the positive or negative line of the electrical circuitry, or, in contrast, lead 18a may be a part of the positive line and lead 18b may be a part of the negative line, or conversely.

In any event, in that the system of which the detector 10 is a part is caused to become deenergized or deactivated, component damage or operational failure is precluded, thereby providing effective positive control for the user under adverse fluid quality conditions. Relating the invention to refrigeration systems, the negative effects resulting from an acid condition therein is prevented before it happens, instead of recourse to remedying such acid contamination after it occurs, as has been past practice.

FIGS. 3 and 4 are directed to another form of detector 50 in accordance with the teachings of the invention at hand. In this instance, the detector 50 is shown as part of a fluid flow line, although as in the instance of the embodiment of FIGS. 1 and 2, it may also be utilized as a compressor insert, with slight modification.

In any event, a body member 52 is provided having threaded end portions 52a and 52b, where the former receives a cap member 54 which has an extended threaded portion 54a for receiving a sealing member 55 which cooperates with a flared end of a fluid line 56. The end 52b of the body member 52 includes a similar structural relationship, in this instance receiving a cap member 54' having a threaded portion 54a' for receiving a sealing member 55' which cooperates with another flared end of the fluid line 56.

In a typical embodiment of the form of invention of FIGS. 3 and 4, the body member 52 has oppositely disposed laterally opening intermediate portions 52c and 52d, each respectively receiving threaded cap members 58 and 60. As with detector 10, electrical conduits 18 and 18' extend through the cap members 58 and 60.

Plate members 62 and 62' are respectively disposed within the openings of the intermediate portions 52c and 52d of the body member 52, as by a press-fit, for example, where such plates 62 and 62' typically position pairs of insulators 64a and 64b, 64a' and 64b', 65a and 65b, and 65a' and 65b'. Threaded members, as bolts 66 and 68, and 66' and 68', extend through openings in the plates 62 and 62', each having a corresponding nut 66a, 68a, 66a' and 68a', where fiber discs 69 are positioned between the heads of the bolts and the insulators 64a, 64a', 65a and 65a', and as spacers, where desired.

The electric assembly 70 defining this form of invention comprises coated wires 72 and 74 extending from insulator 64a and 64a', as well as from 65a and 65a', and secured by the heads of the bolts 66, 68, 66' and 68', portions of which wires are twisted together at 75. An electrical circuit is completed through lead 18a (secured in position by nut 66a), bolt 66, coated wire 72, bolt 66' and lead 18a' (secured in position by nut 66a'), while another electrical circuit is completed through lead 18b (secured in position by nut 68a), bolt 68, coated wire 74, bolt 68' and lead 18b' (secured in position by nut 68a'). The aforesaid first circuit may be on the positive side of an electrical line, while the aforesaid second circuit may be on the negative side of an electrical line, or conversely.

In any event, upon the deterioration of the quality of a fluid being passed through the body member 52 of the detector 50, the coating on the wires 72 and 74 disintegrate, as for example, where the coating is varnish, causing a direct contact to be made between the twisted portions 75 thereof. As a result, a short circuit occurs, breaking the line and interrupting the circuit and, hence, system operation. In the alternative, a relay may break and a signal energized to indicate the contamination condition.

From the preceding, it should be understood that the applicant herein has provided a new and novel detector, which in typical embodiment, is readily placed for effective use and which is sensitive to the quality and condition of a flowing fluid. Operational breakdown of an apparatus, such as a refrigeration system, is readily precluded, at an optimum time, and with ease and simplicity.

The detector described hereabove is, of course, susceptible to various changes within the spirit of the invention. For example, the proportions of the disclosed body members may be varied, the configuration of the spring tension means of the embodiment of FIGS. 1 and 2 may be altered, as well as the configuration of the coated wire assembly defined by the embodiment of the FIGS. 3 and 4. Moreover, specific mounting structure for the electrical assemblies may be altered from application to application. Thus, the preceding description should be considered illustrative and not as limiting the scope of the following claims.

I claim:

1. A fluid quality detector comprising a hollow body member containing a fluid therewithin, electrical sensing elements disposed in said fluid, means mounting said electrical sensing elements on said hollow body member, and a coating electrically isolating said electrical sensing elements at a first quality condition of said fluid and being disintegratable at a second quality condition of said fluid.

2. A fluid quality detector comprising a hollow body member having a fluid path therewithin, an electrical sensing assembly disposed within said hollow body member in contact with said fluid path, means mounting said electrical sensing assembly in said hollow body member, said electrical sensing assembly comprising at least two electrical conductors having a portion thereof twisted together, and at least said twisted portion of said electrical conductors coated with a disintegratable substance which electrically isolates said electrical conductors at a first quality condition of said fluid and permits electrical contacting of said electrical conductors at a second quality condition of said fluid.

3. A fluid quality detector comprising a hollow body member containing a fluid therewithin, an electrical sensing assembly disposed within said hollow body member in contact with said fluid, insulator means mounting said electrical sensing assembly within said hollow body member, said electrical sensing assembly comprising two electrical conductors extending between pairs of said insulator means, and at least a portion of each of said electrical conductors coated with a disintegratable substance and twisted together, said disintegratable substance serving to electrically isolate said electrical conductors at a first quality condition of said fluid and permitting electrical contacting of said electrical conductors at a second quality condition of said fluid.

References Cited by the Examiner

UNITED STATES PATENTS 1,271,865   7/1918   Dodds _____ 200—61.04 X
3,122,001   2/1964   Pritchett et al. ____ 200—61.04 X BERNARD A. GILHEANY, *Primary Examiner.*

R. N. ENVALL, JR., *Assistant Examiner.*